United States Patent [19]
Nakamura et al.

[11] Patent Number: 5,643,988
[45] Date of Patent: Jul. 1, 1997

[54] SHAPED ARTICLE OF LIQUID CRYSTALLINE POLYMER

[75] Inventors: Kiyokazu Nakamura; Norio Kitajima, both of Nagoya; Toshihide Inoue, Ichinomiya, all of Japan

[73] Assignee: Toray Industries, Inc., Japan

[21] Appl. No.: 628,396

[22] Filed: Apr. 5, 1996

Related U.S. Application Data

[63] Continuation of Ser. No. 365,026, Dec. 28, 1994, abandoned.

[30] Foreign Application Priority Data

Dec. 28, 1993 [JP] Japan ................................ 5-338096

[51] Int. Cl.$^6$ .............................. C08L 67/03; C08L 67/04
[52] U.S. Cl. ................. 524/449; 524/451; 524/513; 524/514; 525/132; 525/133; 525/152
[58] Field of Search .................................. 525/132, 152, 525/133; 524/513, 514, 449, 451

[56] References Cited

U.S. PATENT DOCUMENTS

| | | | |
|---|---|---|---|
| 4,281,079 | 7/1981 | Baer | 525/152 |
| 4,429,078 | 1/1984 | Cogswell | 525/165 |
| 5,189,091 | 2/1993 | Laughner | 524/445 |

FOREIGN PATENT DOCUMENTS

| | | |
|---|---|---|
| 0 111 179 A1 | 6/1984 | European Pat. Off. . |
| 0 369 734 A3 | 5/1990 | European Pat. Off. . |
| 0 380 112 Ae | 8/1990 | European Pat. Off. . |
| 0 382 486 A3 | 8/1990 | European Pat. Off. . |
| 0 462 844 A3 | 12/1991 | European Pat. Off. . |
| 49-72393 | 7/1974 | Japan . |
| 54-77691 | 6/1979 | Japan . |
| 57-24407 | 2/1982 | Japan . |
| 57-74407 | 2/1982 | Japan . |
| 57-172921 | 10/1982 | Japan . |
| 62-241995 | 10/1987 | Japan . |
| 63-146959 | 6/1988 | Japan . |
| 64-33123 | 2/1989 | Japan . |
| 01 121 357 | 5/1989 | Japan . |
| 1 197 555 | 8/1989 | Japan . |
| 01 292 057 | 11/1989 | Japan . |
| 02208035 | 8/1990 | Japan . |
| 04120162 | 4/1992 | Japan . |
| 04 202 461 | 7/1992 | Japan . |
| 6 073 239 | 3/1994 | Japan . |
| 6 073 272 | 3/1994 | Japan . |
| WO-A-92 18568 | 10/1992 | WIPO . |

OTHER PUBLICATIONS

Rubber Digest, vol. 27, No. 8 pp. 7–14 1975.

*Primary Examiner*—Patricia A. Short
*Attorney, Agent, or Firm*—Austin R. Miller

[57] ABSTRACT

The present invention relates to a shaped article of a liquid crystalline polymer containing (A) 100 parts by weight of a liquid crystalline polyester and/or liquid crystal polyesteramide capable of forming an anisotropic melt and (B) 0.01 to 2 parts of an olefinic polymer and having a retention rate of a weld strength of 15% to 100%, which has excellent heat stability, mechanical properties, dimensional stability and mold releasability and is suitable for various application uses such as electrical and electronical related devices, accurate machine related devices, office related devices, automobile related parts.

14 Claims, 1 Drawing Sheet

SHAPED ARTICLE OF LIQUID CRYSTALLINE POLYMER

This application is a continuation of application Ser. No. 08/365,026, filed Dec. 28, 1994, now abandoned.

BACKGROUND OF THE INVENTION

(A) Field of the Invention

The present invention relates to a shaped article of a liquid crystalline polymer having excellent mold releasability from a die when molding, having excellent thermal and chemical stability without generating decomposition gases etc., having a weld with excellently balanced thermal stability exhibiting a low decrease in strength of a weld, mechanical properties and moldability and having excellent dimensional stability.

(B) Description of the Prior Art

The need for plastic materials having high performance have been growing in recent years. Numerous polymers having various new types of performance have been developed and marketed. However, optical anisotropic liquid crystalline polymers characterized by the parallel sequences of molecular chains, have particularly noted due to their superior flowability, thermal resistance, mechanical properties, and mechanical stability. Examples of such polymers capable of forming an anisotropic melt include, for example, a liquid crystal polyester obtained by copolymerizing polyethyleneterephthalate with p-hydroxybenzoic acid (Japanese Unexamined Patent Publication No. 49-72393), a liquid crystalline polyester obtained by copolymerizing p-hydroxybenzoic acid and 6-hydroxy-2-naphthoic acid (Japanese Unexamined Patent Publication No. 54-77691), a liquid crystal polyester obtained by copolymerizing 4,4'-dihydroxybiphenyl, terephthalic acid and isophthalic acid with p-hydroxybenzoic acid (Japanese Examined Patent Publication No. 57-24407), a liquid crystalline polyester amide formed from 6-hydroxy-2-naphthoic acid, p-aminophenol and terephthalic acid (Japanese Unexamined Patent Publication No. 57-172921), and a liquid crystalline polyesteramide formed from p-hydroxybenzoic acid, 4,4'-dihydroxybiphenyl, terephthalic acid, p-aminobenzoic acid and polyethylene terephthalate (Japanese Unexamined Patent Publication No. 64-33123).

However, it is also well known in the art that these liquid crystalline polymers have problems including large mechanical anisotropy and dimensional anisotropy. For solving these problems, various attempts have been made. For example, a method wherein a glass fiber is added to a liquid crystalline polymer (Rubber Digest, Vol. 27, No. 8, pp. 7–14, 1975), a method wherein powder in the form of a plate or flake such as mica, talc or graphite is compounded into a liquid crystalline polymer (Japanese Unexamined Patent Publication No. 63-146959). Thus, the anisotropy is relaxed (or decreased) and simultaneously the mechanical properties, thermal resistance, moldability and dimensional stability are further improved. As a result, the liquid crystalline polymer compositions are used, as an engineering plastic, in a wide variety of application fields, such as automobile parts, electrical and electronic parts, precise mechanical parts, office machine parts.

Since liquid crystalline polymers are generally excellent in the flowability thereof, the molding and processing are easy and the liquid crystalline polymers can be used as thin-walled molded products or molded articles having complicated shapes. However, various problems have been pointed out in the molding of such thin-walled molded products and molded articles having complicated shapes such that the dimensional stability thereof becomes poor due to poor mold releasability, the operation to remove the molded articles from the mold, and the productivity is decreased.

Generally, as a method for improving the mold releasability, methods for adding various releasing agents such as fatty acid esters, metal salts of fatty acids, fatty acid amides, low molecular weight polyethylene polymers are added to the liquid crystalline polymers are known in the art. In addition, Japanese Unexamined Patent Publication No. 2-208035 discloses a method for formulating fatty acid esters to liquid crystalline polyesters and Japanese Unexamined Patent Publication No. 4-120162 discloses a method for adding fatty acid esters composed of polyols (e.g., glycerol and pentaerythritol) and fatty acids having 12 or more carbon atoms.

However, when these methods are applied to liquid crystalline polymers, there cause other problems, due to the high processing temperature of the liquid crystalline polymers, that the releasing agents decomposes to generate volatile gases, and therefore, not only the outside appearance of the molded articles is adversely affected, but also the effects of the releasing agents are impaired, whereby the release of the molded article from the die becomes poor and the shape of the molded article is changed (or deformed). Especially, in the case of molded articles having a weld (i.e., which is provided by plural melted resin flows encountering in the mold), the strength at the weld is largely decreased and the strength of the molded articles become poor and the molded articles cannot be practically used due to the shortage in the strength of the molded articles, especially in the weld thereof.

SUMMARY OF THE INVENTION

Accordingly, the objects of the present invention are to obviate the above-mentioned problems and to provide a shaped article of a liquid crystalline resin having excellent mold releasability from a mold when molded, having good thermal and chemical stability without causing the deformation of the molded articles and without generating the decomposed gases, having small decrease in the strength of the weld, having the weld with the balanced excellent properties of thermal resistance, mechanical properties and moldability, and excellent dimensional stability.

Other objects of the present invention are to provide shaped articles, e.g., three-dimensional molded articles, sheets, vessels, pipes, of liquid crystalline polymer useful in the various application fields, including electrical and electronic parts represented by various gears, various cases sensors, LEP lamps, connectors, sockets, resistors, relay case switches, coil bobbins, condensers, variable condensers, optical pickups, oscillators, various types of terminal boards, transformers, plugs, printed circuit boards, tuners, speakers, microphones, headphones, small motors, magnetic head bases, power modules, semiconductors, FDD carriages, FDD chassis motor brush holders, parabolic antennas and computer parts; home appliance and electrical office product parts represented by VTR parts, television parts, irons, hair dryers, rice cooker parts, microwave oven parts, audio parts, audio equipment parts such as those for audio laser disks and compact disks, lighting parts, refrigerator parts, air conditioner parts, typewriter parts and word processor parts; mechanical parts represented by office computer parts, telephone parts, facsimile parts, copier parts, cleaning tools, oilless bearings, stern bearings, water bearings, motor parts, lighters and typewriters; optical equipment and precision machinery parts represented by microscopies, binoculars, cameras and clocks; and, automotive and vehicular parts such as alternator terminals, alternator connectors, IC regulators, potentiometer bases, various valves such as exhaust gas valves, various fuel, exhaust and air intake pipes, air intake nozzle snorkels, intake manifolds, fuel pumps, engine coolant joints, carburetor main bodies, carburetor spacers, exhaust gas sensors, coolant sensors, oil temperature sensors, brake pad wear sensors, throttle position sensors, crankshaft position sensors, air flow meters, brake pad wear sensors, air conditioner thermostat bases, heater air flow control valves, radiator motor brush holders, water pump impellers, turbine vanes, wiper motor parts, distributors, starter switches, starter relays, transmission wire harnesses, window washer nozzles, air conditioner panel switch plates, fuel system solenoid valve coils, fuse connectors, horn terminals, electrical equipment insulating plates, step motor rotors, lamp sockets, lamp reflectors, lamp housings, blake pistons, solenoid bobbins, engine oil filters and ignition device cases.

The following provides a description of the constitution for achieving the objects of the present invention.

In accordance with the present invention, there is provided a shaped article of a liquid crystalline polymer having a weld, which is provided by plural melted resin flows encountering in the mold, obtained by melt molding a composition comprising (A) 100 parts by weight of at least one liquid crystalline polymer selected from the group consisting of liquid crystalline polyesters and liquid crystalline polyester amides capable of forming an anisotropic melt; and (B) 0.01 to 2 parts by weight of at least one olefinic polymer selected from the group consisting of (a) polyethylene, (b) polypropylene, (c) copolymers of ethylene and α-olefin having 3 or more carbon atoms, (d) copolymers of propylene and α-olefin having 4 or more carbon atoms, (e) copolymers of ethylene, α-olefin having 3 or more carbon atoms and a non-conjugated diene and (f) copolymers of propylene, α-olefin having 4 or more carbon atoms and a non-conjugated diene and having a weight-average molecular weight of 10,000 to 600,000, said composition having a retention rate of a weld strength 15% to 100% obtained by the following formula (1), based upon flexural strengths determined from a weld shaped article (X) having a weld, which is provided by plural melted resin flows encountering in the mold, at substantially the center portion thereof and a non-weld shaped article (Y) having no weld, both obtained by injection molding the composition under the following conditions:

Retention rate of weld strength (%)=(Flexural strength of shaped article (X) having weld/Flexural strength of shaped article (Y) having no weld)×100 . . . (1)

Injection molding condition:
Cylinder temperature: Melting point (°C.) of liquid crystalline polymer +10° C.
Mold temperature: 90° C.
Size of shaped article: 6.0 mm (width)×127 mm (length) ×1 mm (thickness).

In accordance with the present invention, there is also provided the above-mentioned shaped article having a weld with a retention rate of the weld of 20% to 100%.

In accordance with the present invention, there is further provided the above-mentioned shaped article, wherein the liquid crystalline polymer (A) is at least one polymer selected from the group consisting of fully aromatic liquid crystalline polyesters, fully aromatic liquid crystalline polyesteramides, liquid crystalline polyesters having an ethylenedioxy unit, and liquid crystalline polyesteramides having an ethylenedioxy unit.

In accordance with the present invention, there is still further provided the above-mentioned shaped article, wherein the liquid crystalline polyester (A) is at least one liquid crystalline polyesters composed of the following structural units (I), (III) and (IV), liquid crystalline polyesters composed of the following structural units (I), (II) and (IV), and liquid crystalline polyesters having the following structural units (I), (II), (III) and (IV):

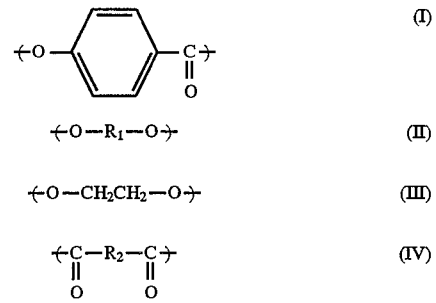

wherein $R_1$ represents at least one group selected from the group consisting of:

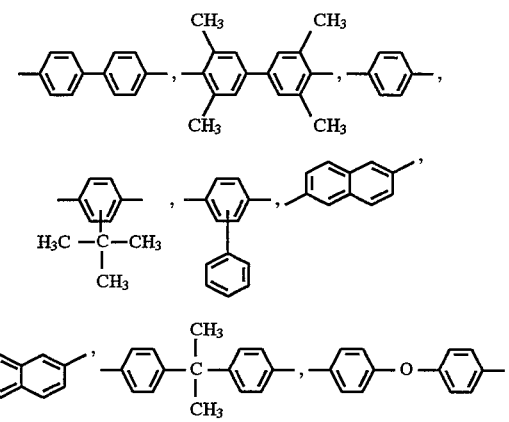

and $R_2$ represents at least one group selected from the group consisting of:

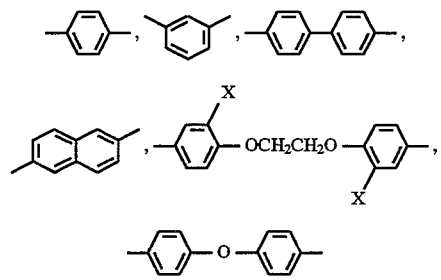

wherein x represents a hydrogen atom or chlorine atom, and the total number of moles of structural unit (II) and structural (III) are substantially equal to the total of the number of moles of structural unit (IV).

In accordance with the present invention, there is still further provided the above-mentioned shaped article, wherein the composition further contains 400 parts by weight or less of a filler, based upon 100 parts by weight of the liquid crystalline polymer (A).

In accordance with the present invention, there is still further provided the above-mentioned shaped article, wherein the composition further contains 0.5 to 60 parts by weight of an organic bromine compound based upon 100 parts by weight of the liquid crystalline polymer (A).

In accordance with the present invention, there is still further provided the above-mentioned shaped article, wherein the organic bromine compound is poly(brominated styrene) having a weight average molecular weight of $1\times10^3$ to $120\times10^4$ and having at least one following structural unit obtained from brominated styrene monomer as the major structural component.

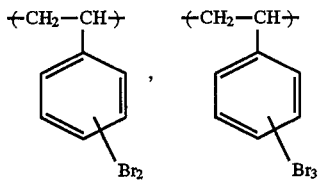

In accordance with the present invention, there is sill further provided the above-mentioned shaped article, wherein the composition further contains 0.01 to 10 parts by weight of carbon black, based upon 100 parts by weight of the liquid crystalline polymer (A).

BRIEF DESCRIPTION OF THE DRAWING

The present invention will be better understood from the description set forth below with reference to the accompanying drawings of FIGS. 1 and 2, which schematically illustrate perspective views of a weld molded article (X) and a box-type molded article obtained in Example 1, respectively.

PREFERRED EMBODIMENT OF THE INVENTION

Figure 1:
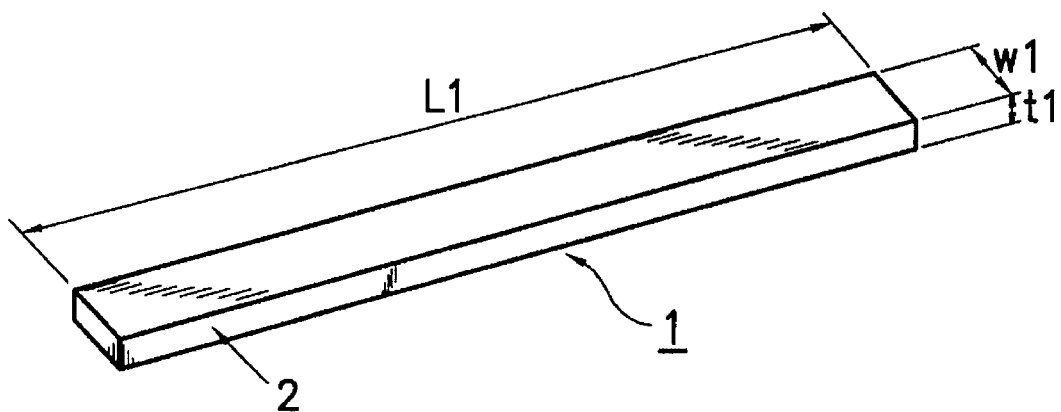

In the present invention, as the component (A), at least one liquid crystalline polymer selected from liquid crystalline polyesters and liquid crystalline polyesteramides both capable of forming an anisotropic melt is used.

The liquid crystalline polyesters and the liquid crystalline polyesteramides capable of forming an anisotropic melt referred to in the present invention are liquid crystalline polyesters which form an anisotropic melt comprising structural units selected from structural units such as an aromatic oxycarbonyl unit, an aromatic dioxy unit, an aromatic dicarbonyl unit and an ethylenedioxy unit, and liquid crystalline polyesteramides capable of forming an anisotropic melt comprising structural units such as the above-mentioned structural units, an aromatic iminocarbonyl unit, an aromatic diimino unit and an aromatic iminooxy unit.

The liquid crystalline polyester and/or polyesteramide capable of forming an anisotropic melt used in the present invention may be an fully aromatic thermotropic polyester, preferably one having a naphthalene rang, an fully aromatic thermotropic polyesteramide, preferably one having a naphthalene ring, a liquid crystalline polyester having ethylenedioxy units, or a liquid crystalline polyesteramide having ethylenedioxy amide capable of forming an anisotropic molten phase.

Preferable examples of liquid crystalline polyesters include liquid crystalline polyesters comprising the structural units of (I), (III) and (IV), (I), (II) and (IV) or (I), (II), (III) and (IV). Among these, the use of the liquid crystalline polyester having the structural unit of (I), (II) and (IV) or having the structural unit of (I), (II), (III) and (IV) is preferable.

Structural unit (I) is a structural unit of a polyester formed from p-hydroxybenzoic acid. Structural unit (II) represents a structural unit formed from an aromatic dihydroxy compound selected from 4,4'-dihydroxybiphenyl, 3,3'5,5'-tetramethyl-4,4'-dihydroxyphenyl, hydroquinone, t-butylhydroquinone, phenylhydroquinone, 2,6-dihydroxynaphthalene, 2,7-dihydroxynaphthalene, 2,2-bis(4-hydroxyphenyl)propane and 4,4'-dihydroxyphenylether. Structural unit (III) represents a structural unit formed from ethyleneglycol. Structural unit (IV) represents a structural unit formed from an aromatic dicarboxylic acid selected from terephthalic acid, isophthalic acid, 4,4'-diphenyldicarboxylic acid, 2,6-naphthalenedicarboxylic acid, 1,2-bis(phenoxy)ethane-4,4'-dicarboxylic acid, 1,2-bis(2-chlorophenoxy)ethane-4,4'-dicarboxylic acid and 4,4'-diphenylether dicarboxylic acid.

Among these, the especially preferable one is that having $R_1$ of:

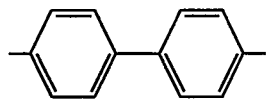

and having $R_2$ of

The liquid crystalline polymers preferably usable in the present invention are liquid crystalline polyesters comprising the above-mentioned structural units (I), (II) and (IV) or (I), (II), (III) and (IV), and the copolymerization amounts of the above-mentioned structural units (I), (II), (III) and (IV) are not limited. However, the following copolymerization amounts are preferable in consideration of the flowability property thereof.

Namely, in the case of those containing the above-mentioned structural unit (III), the molar fraction of the total of the structural units (I) and (II) to the total of the above-mentioned structural units (I), (II) and (III) is preferably 60 to 95 mol %, particularly preferably 75 to 93 mol % in consideration of the thermal resistance, flame resistance and mechanical properties thereof. In addition, the molar fraction of the structural unit (III) to the total of the structural units (I), (II) and (III) is preferably 40 to 5 mol %, particularly preferably 25 to 7 mol %.

In addition, the molar fraction ratio (I)/(II) of the structural unit (I) to the structural unit (II) is preferably 75/25 to 95/5, and particularly preferably 78/22 to 93/7 in consideration of the balance between the thermal resistance and the flowability. Furthermore, it is preferable that, the total number of moles of the structural unit (II) and the structural unit (III) is substantially equal to the number of moles of the structural unit (IV). The term "substantially" used herein means that, if desired, the number of either of the carboxy end group or the hydroxyl end group in the end group of the polyester can be made larger, but in such a case, the total number of moles of the structural units (II) and (III) is not completely equal to the number of moles of the structural unit (IV).

On the other hand, in the case of those not containing the above-mentioned structural unit (III), the molar fraction of the structural unit (I) to the total of the structural units (I) and (II) is preferably 40 to 90 mol %, and particularly preferably 60 to 88 mol %. It is preferable that the number of moles of the structural unit (II) is substantially equal to the number of moles of the structural unit (IV). In this case, the meanings of the term "substantial" is the same as mentioned in the above case including the unit (III). This is the same as in the case of the liquid crystalline polyesters having the structural units of (I), (III) and (IV).

Furthermore, when the above-mentioned liquid crystalline polyesters particularly preferably usable in the present invention is polycondensates, aromatic dicarboxylic acids such as 3,3'-diphenyldicarboxylic acid and 2,2'-diphenyldicarboxylic acid, aliphatic dicarboxylic acids such as adipic acid, azelaic acid, sebacic acid and dodecanedionic acid, alicyclic dicarboxylic acids such as hexahydroterephthalic acid, aromatic diols such as chlorohydroquinone, methylhydroquinone, 4,4'-dihydroxydiphenylsulfone, 4,4'-dihydroxydiphenylsulfide and 4,4'-dihydroxybenzophenone, aliphatic and alicyclic diols such as 1,4-butanediol, 1,6-hexanediol, neopentylglycol, 1,4-cyclohexanediol and 1,4-cyclohexanedimethanol, aromatic hydroxycarboxylic acids such as m-hydroxybenzoic acid and 2,6-hydroxynaphthoic acid, and p-aminophenol and p-aminobenzoic acid can be additionally used, other than the above-mentioned components forming the structural units (I) to (IV) within a range of low proportions to an extent that does not impair the object of the present invention.

In addition to the above structural units (I) to (IV), as the liquid crystalline polyester amides, the polyester amides capable of forming an anisotropic melt phase and containing a p-imino phenoxy unit formed from p-aminophenol.

There are no particular limitations to the process for producing the above-mentioned liquid crystalline polyesters preferably usable in the present invention and the liquid crystalline polyesters and polyesteramides can be produced according to any known polyester or polyesteramide condensation polymerization methods.

For example, in the case of those not containing the above-mentioned structure unit (III) can be preferably produced by the following methods (1) and (2), and in the case of those containing the structural unit (III) can be preferably produced by the following method (3).

(1) A production process using a condensation polymerization with the removal of acetic acid from a diacrylated product of p-acetoxybenzoic acid, an aromatic dihydroxy compound such as 4,4'-diacetoxybiphenyl or para-4,4'-diacetoxybenzene, and an aromatic dicarboxylic acid such as terephthalic acid.

(2) A production process using a condensation polymerization reaction with the removal of acetic acid from the reaction of p-hydroxybenzoic acid and an aromatic dihydroxy compound such as 4,4'-dihydroxybiphenyl or hydroxyquinone, and acetic anhydride with an aromatic dicarboxylic acid such as terephthalic acid, followed by acylation of phenolic hydroxyl groups.

(3) A production process according to the above-mentioned (1) or (2) carried out in the presence of a polymer or oligomer such as polyethylene terephthalate, or a bis(β-hydroxyether)ester of an aromatic dicarboxylic acid such as bis(β-hydroxyethyl)terephthalate.

In addition, these condensation polymerization reactions can be carried out without using a catalyst, but a catalyst may be optionally used. Typical examples of such catalysts usable in the condensation polymerization reaction include metal compounds such as stannous acetate, tetrabutyltitanate, potassium acetate, sodium acetate, antimony trioxide and magnesium metal.

The logarithmic viscosity (or inherent viscosity) of the liquid crystal polymer (A) according to the present invention can be measured in pentafluorophenol. It is preferable that the value measured at 60° C. at a concentration of 0.1 g/dl is at least 0.5 dl/g, and particularly in the case of those containing the above-mentioned structural unit (III), the value of 1.0 to 3.0 dl/g is preferable. On the other hand, in the case of those not containing the above-mentioned structural unit (III), the logarithmic viscosity (or inherent viscosity) value of 2.0 to 10.0 dl/g is preferable.

In addition, the melt viscosity of the liquid crystal polymer (A) usable in the present invention is preferably 10 to 20,000 poise, and more preferably 20 to 10,000 poise.

Furthermore, the above-mentioned melt viscosity refers to the value measured at a temperature 10° C. higher than the melting point (Tm)(°C.) of the liquid crystal resin (A) (i.e. Tm +10° C.) using a Koka type flow tester under the conditions of a shear rate of 1,000 (1/sec) and a nozzle size of 0.5 mm in diameter by 10 mm in length.

The melting point (Tm)(°C.) referred herein represents the endothermic peak temperature which is observed when the measurement is carried out at a temperature-elevating rate of 20° C./min by using a differential scanning calorimeter, i.e., $Tm_2$, described hereinafter.

For the differential scanning calorimetric measurement described above, a polymer obtained by polymerization is heated from room temperature to a temperature exceeding the melting point at a temperature-elevating rate of 20° C./min, and the observed endothermic peak temperature (hereinafter referred to as "$Tm_1$") is measured. After the measurement of $Tm_1$, the polymer is maintained at a temperature of $Tm_1+20°$ C. for 5 minutes, followed by cooling once down to room temperature at a temperature-dropping rate of 20° C./min, and the temperature is then elevated at a rate of 20° C./min. The endothermic peak temperature (hereinafter referred to as "$Tm_2$") measured at this second run is measured.

The olefinic polymer usable in the present invention is at least one olefinic polymer selected from the group consisting of (a) polyethylene, (b) polypropylene, (c) copolymers of ethylene and α-olefin having 3 or more carbon atoms, preferably 3 to 20 carbon atoms, (d) copolymers of propylene and α-olefin having 4 or more carbon atoms, preferably 4 to 20 carbon atoms, (e) copolymers of ethylene, α-olefin having 3 or more carbon atoms, preferably 3 ti 20 carbon atoms, and a non-conjugated diene and (f) copolymers of propylene, α-olefin having 4 or more carbon atoms, preferably 4 to 20 carbon atoms, and a non-conjugated diene.

Examples of the preferable α-olefins having 3 or more carbon atoms are propylene, butene-1, pentene-1,3-methylpentene-1, octacene-1. These may be used alone or in any mixture thereof. The use of propylene and butene-1 is further preferable.

Examples of the preferable α-olefins having 4 or more carbon atoms are those having 3 or more carbon atoms exemplified above, other than propylene. These may be used alone or in any mixture thereof.

Examples of the preferable non-conjugated dienes are 5-ethylidene-2-norbornene, dicydopentadiene and 1,4-hexadiene. Again, these non-conjugated dienes may be used alone or in any mixture thereof.

The ratio of ethylene/α-olefin having 3 or more carbon atoms in the copolymer thereof according to the present invention is preferably 40/60–99/1 (mole ratio), more preferably 70/30–95/5 (mole ratio). The ratio of propylene α-olefin having 4 or more carbon atoms in the copolymer thereof Is preferably 40/60–99/1 (mole ratio), more preferably, 70/30–95/5 (mole ratio).

The ethylene content of the ethylene/$C_3$ or more α-olefin/non-conjugated diene copolymer is preferably 5–96.9 mole %, more preferably 30–84.5 mole %. The amount of α-olefin having 3 or more carbon atoms is preferably 3–80 mole %, more preferably 15–60 mole %, and the amount of non-conjugated diene is preferably 0.1–15 mole %, more preferably 0.5–10 mole %. Furthermore, the propylene content of the propylene/α-olefin having $C_4$ or more carbon atoms/non-conjugated diene is 5–96.9 mole % more preferably 30–84.5 mole % and the content of α-olefin having 4 or more carbon atoms is preferably 3–80 mole %, more preferably 15–60 mole %, and the content of the non-conjugated diene is preferably 0.1 to 15 mole %, more preferably 0.5 to 10 mole %.

Examples of the above-mentioned copolymers are ethylene/propylene copolymer, ethylene/butene-1 copolymer, ethylene/pentene-1 copolymer, ethylene/propylene/butene-1 copolymer, propylene/pentene-1 copolymer, propylene/butene-1 copolymer, propylene/pentene-1 copolymer, propylene/butene-1 copolymer, ethylene/propylene/5-ethylidene-2-nonbornene copolymer, ethylene/propylene/1,4-hexadiene copolymer, propylene/butene-1/1,4-hexadiene copolymer, ethylene/propylene/dicyclopentadiene copolymer, etc. Among these, the use of ethylene/propylene copolymer and ethylene/butane-1 copolymer are especially preferable due to the excellent thermal stability thereof. These olefinic copolymers may be used alone or in any mixture thereof. In addition, it is preferable from the viewpoint of the flowability of the resultant composition that a comonomer having an epoxy and/or carboxylic acid group is not copolymerized therein.

As mentioned above, according to the present invention, the liquid crystalline polymer composition should have a retention rate of a weld strength of 15% to 100%, preferably 20% to 100%, particularly, preferably 25% to 100%, determined by the following method. When the retention rate of a weld strength is less than 15%, the strength of the weld of the liquid crystalline polymer shaped article is low and is not practically acceptable. Although the upper limit is preferably 100%, the retention rate of up to 60% is particularly acceptable.

The retention rate of the weld strength can be determined according to the present invention as follows.

(1) The test piece (i.e., molded article) is prepared as follows.

A. Test Piece

The test piece is prepared by an injection molding under the following conditions Cylinder temperature: (Melting point (°C.) of liquid crystalline polymer (A) +10)° C.
Mold temperature: 90° C.
Size of shaped article: 6.0 mm (width)×127 mm (length)×1 mm (thickness)

More specifically, weld molded articles (X) having a weld, which is provided by plural melted resin flows encountering in the mold, around the center portion of 6.0 mmW×127 mmL×1 mmT are prepared by injection molding, using a mold provided with gates having a width of 3 mm at the positions of 3 mm from the both edge portions in the lengthwise direction, under the conditions of a cylinder temperature of an injection molding machine of (the melting point of liquid crystalline polymer (A) +10) (°C.) and a mold temperature of 90° C. Furthermore, non-weld molded articles (Y) having no weld is prepared from one gate by injection molding under the same conditions (i.e., a cylinder temperature of an injection molding machine of (the melting point of the liquid crystalline polymer (A) +10) (°C.) and a mold temperature of 90° C., Note: As an error for the condition setting in an injection molding machine, the following ranges are usually allowable.

Cylinder temperature: (Melting point of liquid crystalline polymer (A) +10)(°C.)±8° C.
Mold temperature: 90° C.±10° C.
Size of molded article: 6.0 mm±0.30 mm (width)×127 mm±3 mm (length)×1 mm±0.2 mm (thickness)

When the melting point of the liquid crystalline polymer used in the evaluation is difficult to determine, the cylinder temperature can be substituted with a temperature of (liquid crystal initiation temperature +40)(°C.) and the allowable error range is (liquid crystal initiation temperature +40)(°C.) ±8° C.

FIG. 1 shows a perspective view of the weld molded article (X), obtained by injection molding (1) having a size of 127 mm (length $L_1$)×6.0 mm (width $W_1$)×1 mm (thickness $t_1$) wherein the two gate positions 2 are provided at the position of 3 mm from the both edge portions in the lengthwise direction.

(2) Determination method of retention rate of weld strength

The test pieces obtained above are adjusted at a temperature of 23° C.±2° C. (i.e., room temperature), a relative humidity of 50%±5% for 15 hours.

Then, the flexural strengths of, the weld molded article (X) and non-weld molded article (Y) are determined under the conditions of a spun distance of 20 mm and a strain rate of 0.7 m/min. The retention rate of weld strength is calculated by substituting the determined value of the flexural strength to the equation (1). Thus, the determination of the retention rate of weld strength is determined from the following equation (1), based upon flexural strengths determined from a weld molded article (X) having a weld at substantially the center portion thereof and a non-weld molded article (Y) having no weld:

Retention rate of weld strength (%)=(Flexural strength of molded article (X) having weld/Flexural strength of molded article (Y) having no weld)×100  (1)

The molded article of the liquid crystalline polymer according to the present invention can be produced by melt molding the above-mentioned liquid crystalline composition. As the melt molding method, there are no specific limitation and various molding methods including injection molding, extrusion molding and blow molding. Among these methods, injection molding can be preferably used. As a preferable injection molding method, it is recommendable to feed the above-mentioned liquid crystalline polymer composition to an in-line type injection molding machine set at a temperature within the range of Tm −30° C. to Tm +50° C. (Note: Tm=melting point Of the liquid crystalline polymer composition) (or when the melting point is difficult to determine, a temperature within the range of the liquid crystalline initiation temperature +10° C. to the liquid crystalline initiation temperature +90° C.), followed by injection molding to a mold having a shape corresponding to the desired article and set at a mold temperature of about 70° C. to about 150° C. Thus, the molded article of liquid crystalline composition having a weld can be molded.

The molded article according to the present invention can be molded, for example, as mentioned above, but it is necessary that the molded article has at least one weld.

The "weld" used herein means a portion which is provided by plural melted resin flows encountering in the mold. The both resins may be the same or the different.

EXAMPLES

The present invention will now be further illustrated by, but is by no means limited to, the following Examples.

Reference Example 1

A 994 part by weight amount of p-hydroxybenzoic acid, 126 parts by weight of 4,4'-dihydroxybiphenyl, 112 parts by weight of terephthalic acid, 216 parts by weight of polyethylene terephthalate having an inherent viscosity of approximately 0.6 dl/g and 960 parts by weight of acetic anhydride were charged into a reaction vessel equipped with a stirrer and a distillation tube to obtain the desired liquid crystalline polymer (A) by the completion of condensation polymerization. The melting point of the resultant polymer (A) was 314° C. and a melt viscosity at 324° C. and a shear rate of 1,000/sec was 400 poise.

Reference Example 2

A 994 part by weight amount of p-hydroxybenzoic acid, 222 parts by weight of 4,4'-dihydroxybiphenyl, 147 parts by weight of 2,6-diacetoxynaphthalene, 1078 parts by weight of acetic anhydride and 299 parts by weight of terephthalic acid were charged into a reaction vessel equipped with a stirrer and a distillation tube to obtain the desired polymer (B) by the completion of condensation polymerization.

The melting point (Tm) of this polymer was 336° C. and a melt viscosity at a temperature of 346° C. and a shear rate of 1,000/sec was 520 poise.

Reference Example 3

A 1296 parts by weight amount of p-acetoxybenzoic acid and 346 parts by weight of polyethylene terephthalate having an inherent viscosity of approximately 0.6 dl/g were charged into a reaction vessel equipped with a stirrer and a distillation tube according to Japanese Unexamined Patent Publication No. 49-72393, followed by condensation polymerization to obtain the desired polymer (C) having a melting point (Tm) of 283° C. and a melt viscosity at a temperature of 293° C. and a shear rate of 1,000/sec was 1,200 poise.

Reference Example 4

A 921 parts by weight amount of p-acetoxybenzoic acid and 435 parts by weight of 6-acetoxy-2-naphthoic acid were charged into a reaction vessel equipped with a stirrer and distillation tube according to Japanese Unexamined Patent Publication No. 54-77691, followed by condensation polymerization to obtain the desired polymer (D) having a melting point (Tm) of 283° C. and a melt viscosity at a temperature of 293° C. and a shear rate of 1,000/sec of 2,000 poise.

Examples 1–4 and Comparative Example 1–5

The liquid crystalline polymers obtained in Reference Examples 1–4 were dry blended with olefinic polymers listed in Table 1 in amounts shown in Table 1. Thereafter, the blend was melt kneaded to obtain the pellets, using a twin-screw extruder having a diameter of 30 mm in which the cylinder temperature were set to the melting point of each polymer. The resultant pellets were then fed into the Sumitomo Nestal Promat 40/25 Injection Molding Machine (Sumitomo Heavy Machine Industry K.K.) and injection molded into weld molded products (X) having a weld at substantially the center portion thereof and non-weld molded products (Y) having no weld having a size of 6 mmW×127 mmL×1 mmT under the conditions of a cylinder temperature of Tm +10° C. and a mold temperature of 90° C.

The molded products were adjusted at a temperature of 23°±2° C. and a relative humidity of 50±5% for 15 hours or more and, then, the flexural strengths of the weld molded product (X) having a weld at substantially the center portion thereof and a non-weld molded product (Y) having no weld were determined at a span distance of 25 mm and a strain rate of 1 mm and the retention rate of the weld strength was obtained by substituting the values of the flexural strengths to the equation (1):

Retention rate of weld strength (%)=(Flexural strength of molded product (X) having weld/Flexural strength of molded product (Y) having no weld)×100   (1)

Furthermore, the above pellets were fed to Toshiba 1S55 EPN injection molding machine (Toshiba Kikai Plastic Engineering Co.) to obtain a molded product in the form of a box having a size of 8 mm width×10 mm height×100 mm length×1 mm thickness under the conditions of a cylinder temperature of (Tm of the liquid crystalline polymer+10) (°C.) and a mold temperature of 90° C. The box type molded product thus obtained has the four partition walls having a thickness of 0.8 mm placed with the equal distance, which was injection molded at the two gates. When the molded product was ejected, the ejection force (i.e., mold releasing force) was determined, whereby the mold releasability was evaluated.

Figure 2:
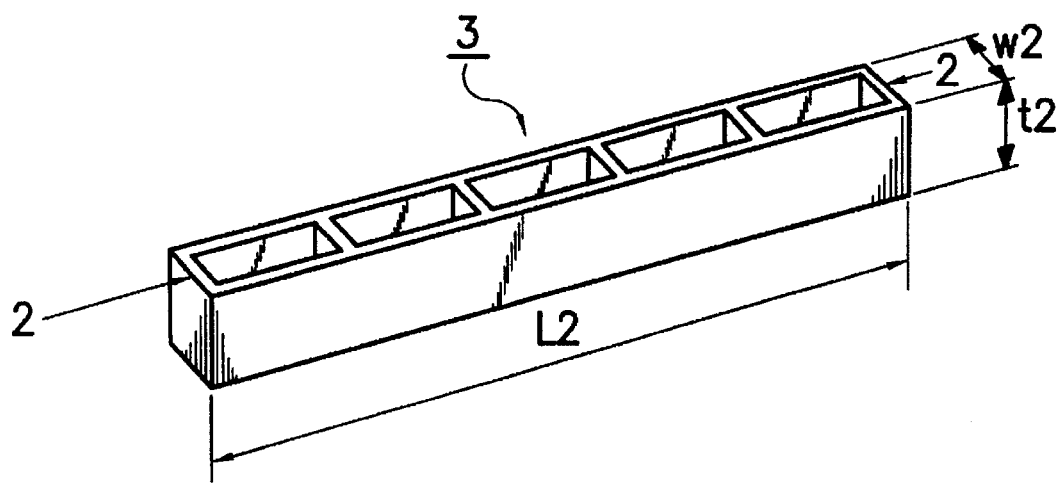

FIG. 2 shows the perspective view of the above box type molded product, wherein the molded product (or article) 3 was injection molded from the gate position 2 provided at the two positions. The size of the box type molded article is 8 mm width ($W_2$)×10 mm height ($t_2$)×100 mm length ($L_2$).

When the above-mentioned ejection force (i.e., mold releasing force) is smaller, the mold releasability is excellent. Furthermore, the presence or absence of the deformation by the ejection pin when released from the mold was visually observed by the shape of the partition portion of the molded product. This is the measure for the dimension stability. The results are shown in Table 1.

TABLE 1

|  | Liquid crystalline polymer | | Olefinic polymer | | | Performance of box type molded product | | |
| --- | --- | --- | --- | --- | --- | --- | --- | --- |
|  | Kind | Amount (wt. part) | Kind | Mw | Amount (wt. part) | Retention rate of weld strength (%) | Mold releasing force (kg) | Change in shape of partition portion |
| Example 1 | A | 100 | PE | 4.0 × 10⁵ | 0.3 | 22 | 35 | None |
| Example 2 | B | 100 | PE | 4.0 × 10⁵ | 0.3 | 22 | 35 | " |

TABLE 1-continued

| | Liquid crystalline polymer | | Olefinic polymer | | Retention rate of weld strength (%) | Performance of box type molded product | |
|---|---|---|---|---|---|---|---|
| | | | | | | Mold releasing force (kg) | Change in shape of partition portion |
| | Kind | Amount (wt. part) | Kind | $\overline{Mw}$ | Amount (wt. part) | | | |
| Example 3 | C | 100 | PE | $4.0 \times 10^5$ | 0.3 | 16 | 40 | " |
| Example 4 | D | 100 | PE | $4.0 \times 10^5$ | 0.3 | 15 | 42 | " |
| Comparative Ex. 1 | A | 100 | — | — | — | 23 | 92 | Yes |
| Comparative Ex. 2 | B | 100 | — | — | — | 23 | 92 | " |
| Comparative Ex. 3 | C | 100 | — | — | — | 18 | 95 | " |
| Comparative Ex. 4 | D | 100 | — | — | — | 16 | 95 | " |
| Comparative Ex. 5 | D | 100 | PE | $4.0 \times 10^5$ | 2.04 | 13 | 30 | " |

Box type molded product: 8 mm width × 10 mm height × 100 mm length × 1 mm thickness with 0.8 mm thick partition
Olefinic polymer: PE = polyethylene Examples 5–17 and Comparative Examples 6–12

The liquid crystalline polymers obtained in Reference Examples 1–4 were dry blended with olefinic polymers and the other additives listed in Table 2 in amounts shown in Table 2. Thereafter, the blend was melt kneaded to obtain the pellets, using a twin-screw extruder having a diameter of 30 mm in which the cylinder temperature were set to the melting point of each polymer. The resultant pellets were then fed into the Sumitomo Nestal Promat 40/25 Injection Molding Machine (Sumitomo Heavy Machine Industry K.K.) and injection molded into weld molded products (X) having a weld at substantially the center portion thereof and non-weld molded products (Y) having no weld having a size of 6 mm W×127 mm L×1 mm T under the conditions of a cylinder temperature of Tm +10° C. and a mold temperature of 90° C.

The molded products were adjusted at a temperature of 23°±2° C. and a relative humidity of 50±5% for 15 hours or more and, then, the flexural strengths of the weld molded product (X) having a weld at substantially the center portion thereof and a non-weld molded product (Y) having no weld were determined at a spun distance of 25 mm and a strain rate of 1 mm and the retention rate of the weld strength was obtained by substituting the values of the flexural strengths to the above-mentioned equation (1):

Furthermore, the above pellets were fed to Toshiba 1S55EPN injection molding machine (Toshiba Machine Plastic Engineering Co., Ltd.) to obtain a molded product in the form of a box having a size of 8 mm width×10 mm height×100 mm length×1 mm thickness, as in Example 1 under the conditions of a cylinder temperature of (Tm of the liquid crystalline polymer +10) (°C.) and a mold temperature of 90° C.

As in Example 1, when the molded product was ejected, the ejection force (i.e., mold releasing force) was determined, whereby the mold releasability was evaluated and also the presence or absence of the deformation by the ejection pin when released from the mold was visually observed. Furthermore, the flexural text was carried out under the conditions of a spun distance of 50 mm and a strain rate of 3 mm and the strength generating cracks at the weld was determined. The results are shown in Table 2.

In Table II, the olefine polymers are shown as follows.
PE=polyethylene
PP=polypropylene
PE/P=ethylene/propylene copolymer (mole ratio 83/17)
PE/B1=ethylene/butene-1 copolymer (mole ratio 90/10)
PE/P/HD=ethylene/propylene/1,4-hexadiene (mole ratio 85/8/7)

TABLE 2

| | Liquid crystalline polymer | | Filler | | Olefinic polymer | | | Liquid crystalline composition Retention rate of weld strength (%) | Performance of box type molded product | | |
|---|---|---|---|---|---|---|---|---|---|---|---|
| | | | | | | | | | Mold releasing force (kg) | Change in shape of partition wall | Strength of weld |
| | Kind | Amount (wt. part) | Kind | Amount (wt. part) | Kind | $\overline{Mw}$ | Amount (wt. part) | | | | |
| Example 5 | A | 100 | Glass fiber | 50 | PE | $4.0 \times 10^5$ | 0.45 | 27 | 25 | None | 3.7 |
| Example 6 | B | 100 | " | 50 | PE | $4.0 \times 10^5$ | 0.45 | 26 | 25 | " | 3.6 |
| Example 7 | C | 100 | " | 50 | PE | $4.0 \times 10^5$ | 0.45 | 20 | 32 | " | 2.5 |
| Example 8 | D | 100 | " | 50 | PE | $4.0 \times 10^5$ | 0.45 | 18 | 32 | " | 2.5 |

TABLE 2-continued

|  | Liquid crystalline polymer | | Filler | | Olefinic polymer | | | Liquid crystalline composition Retention rate of weld strength (%) | Performance of box type molded product | | |
|---|---|---|---|---|---|---|---|---|---|---|---|
|  | Kind | Amount (wt. part) | Kind | Amount (wt. part) | Kind | $\overline{Mw}$ | Amount (wt. part) |  | Mold releasing force (kg) | Change in shape of partition wall | Strength of weld |
| Example 9 | A | 100 | " | 50 | PE | $4.0 \times 10^5$ | 0.05 | 28 | 45 | " | 3.8 |
| Example 10 | A | 100 | " | 50 | PE | $4.0 \times 10^5$ | 1.50 | 25 | 22 | " | 3.5 |
| Example 11 | A | 100 | " | 50 | PE | $3 \times 10^4$ | 0.45 | 26 | 49 | " | 3.5 |
| Example 12 | A | 100 | " | 50 | PP | $1.5 \times 10^5$ | 0.45 | 26 | 30 | " | 3.4 |
| Example 13 | A | 100 | " | 50 | PE/P | $1.0 \times 10^5$ | 0.45 | 26 | 31 | " | 3.5 |
| Example 14 | A | 100 | " | 50 | PE/B1 | $1.1 \times 10^5$ | 0.45 | 27 | 32 | " | 3.6 |
| Example 15 | A | 100 | " | 50 | PE/P/HD | $8 \times 10^4$ | 0.45 | 25 | 35 | " | 3.4 |
| Example 16 | A | 100 | Glass fiber Mica | 40 40 | PE | $4.0 \times 10^5$ | 0.45 | 23 | 26 | " | 3.1 |
| Example 17 | A | 100 | Glass fiber Talc | 40 40 | PE | $4.0 \times 10^5$ | 0.45 | 23 | 27 | " | 2.9 |
| Comparative Ex. 6 | A | 100 | Glass fiber | 50 | — | — | — | 29 | 82 | Yes | Cracking when released |
| Comparative Ex. 7 | B | 100 | " | 50 | — | — | — | 27 | 82 | " | Cracking when released |
| Comparative Ex. 8 | C | 100 | " | 50 | — | — | — | 21 | 85 | " | Cracking when released |
| Comparative Ex. 9 | D | 100 | " | 50 | — | — | — | 19 | 85 | " | Cracking when released |
| Comparative Ex. 10 | A | 100 | " | 50 | PE | 8000 | 0.45 | 10 | 69 | " | 0.7 |
| Comparative Ex. 11 | A | 100 | " | 50 | PE | 3000 | 0.45 | 10 | 69 | " | 0.6 |
| Comparative Ex. 12 | A | 100 | " | 50 | PE | 5000 | 0.45 | 9 | 69 | " | 0.6 |

Examples 18–23

Sample pellets of compositions were produced in the same manner as Example 5, except that the organic bromine compounds listed in Table 4 were blended with liquid crystal polymer from the raw material feed port in the proportions indicated in Table 4 based upon 100 parts by weight of the liquid crystalline polymer in Example 1. These pellets were then fed into the Sumitomo Nestal Promar 40/25 Injection Molding Machine (Sumitomo Heavy Machine Industry K.K.) and molded into testpieces measuring 0.5 mm (thickness)×12.7 mm×127 mm, as well as strip testpieces measuring 0.8 mm (thickness)×12.7 mm×127 mm under conditions of a cylinder temperature of (the melting point of the liquid crystalline polymer +10° C.) and a mold temperature of 90° C. A vertical combustion test was then performed according to UL94 standards using the testpieces to evaluate flame retardancy. The other evaluation tests were carried out in the same manner as in Example 5.

TABLE 3

|  | Liquid crystalline polymer | | Filler | | Olefinic polymer | | | Organic bromine compound | |
|---|---|---|---|---|---|---|---|---|---|
|  | Kind | Amount (wt. part) | Kind | Amount (wt. part) | Kind*1 | $\overline{Mw}$ | Amount (wt. part) | Kind*2 | Amount (wt. part) |
| Example 18 | A | 100 | Glass fiber | 50 | PE | $4.0 \times 10^5$ | 0.45 | FR-1 | 6 |
| Example 19 | A | 100 | " | 50 | PE | $4.0 \times 10^5$ | 0.45 | FR-2 | 6 |
| Example 20 | A | 100 | " | 50 | PE | $4.0 \times 10^5$ | 0.45 | FR-3 | 6 |
| Example 21 | A | 100 | " | 50 | PE | $4.0 \times 10^5$ | 0.45 | FR-4 | 6 |
| Example 22 | A | 100 | " | 50 | PE | $4.0 \times 10^5$ | 0.45 | FR-5 | 6 |
| Example 23 | A | 100 | " | 50 | PE | $4.0 \times 10^5$ | 0.45 | FR-6 | 6 |

TABLE 3-continued

| | | Performance of box type molded product | | | |
|---|---|---|---|---|---|
| | Retention rate of weld strength (%) | Mold releasing force (kg) | Change in shape of partition wall | Strength of weld (kg) | Flame retardency UL-9 |
| Example 18 | 26 | 26 | None | 3.4 | V-O |
| Example 19 | 26 | 26 | " | 3.4 | V-O |
| Example 20 | 25 | 27 | " | 3.4 | V-O |
| Example 21 | 26 | 26 | " | 3.3 | V-O |
| Example 22 | 25 | 29 | " | 3.3 | V-O |
| Example 23 | 25 | 29 | " | 3.2 | V-O |

*1: PE = polyethylene
*2: see Table 4

TABLE 4

| No. | Structure |
|---|---|
| FR-1 | Poly(brominated styrene) obtained by polymerization of a monomer containing 80% by weight of dibrominated styrene, 15% by weight of monobrominated styrene, and 5% by weight of tribrominated styrene (bromine content: 59%) Weight average molecular weight: $30 \times 10^4$ |
| FR-2 | Poly(brominated styrene) obtained by polymerization of tribrominated styrene monomer (bromine content: 68%) Weight average molecular weight: $30 \times 10^4$ |
| FR-3 | Dibrominated polystyrene obtained by bromination of polystyrene (bromine content: 60%) Weight average molecular weight: $26 \times 10^4$ |
| FR-4 | Tribrominated polystyrene obtained by bromination of polystyrene (bromine content: 68%) Weight average molecular weight: $25 \times 10^4$ |
| FR-5 | Brominated epoxy polymer |
| FR-6 | Brominated polycarbonate |

Examples 24–28

Example 5 was further repeated except that carbon black was formulated as shown in Table 5 below.

The results are shown in Table 5.

dimensional stability and mold releasability and also excellent in the weld strength, and therefore, are suitable for various applications such as electrical and electronic equipment, precision machinery related equipment, office equipment, and automobile and vehicular related equipment.

We claim:

1. A shaped article of a liquid crystalline polymer having a weld, which is provided by plural melted resin flows encountering in a mold, obtained by melt molding a composition comprising (A) 100 parts by weight of at least one liquid crystalline polymer capable of forming an anisotropic melt selected from the group consisting of liquid crystalline polyesters and liquid crystalline polyester amides and (B) 0.01 to 2 parts by weight of at least one olefinic polymer, having a weight-average molecular weight of 10,000 to 600,000, selected from the group consisting of (a) polyethylene, (b) polypropylene, (c) copolymers of ethylene and α-olefin having 3 or more carbon atoms, (d) copolymers of propylene and α-olefin having 4 or more carbon atoms, (e) copolymers of ethylene, α-olefin having 3 or more carbon atoms and a non-conjugated diene and (f) copolymers of propylene, α-olefin having 4 or more carbon atoms and a non-conjugated diene, said composition having a

TABLE 5

| | Liquid crystalline polymer | | Filler | | Olefinic polymer | | | | Carbon black | | Retention rate of weld strength (%) | Performance of box type molded product | | |
|---|---|---|---|---|---|---|---|---|---|---|---|---|---|---|
| | | | | | | | | | | | | Mold releasing force (kg) | Change in shape of partition wall | Strength of weld (kg) |
| | Kind | Amount (wt. part) | Kind | Amount (wt. part) | Kind | $\overline{Mw}$ | Amount (wt. part) | pH | Amount (wt. part) | | | | | |
| Example 24 | A | 100 | Glass fiber | 50 | PE | $4.0 \times 10^5$ | 0.45 | 7 | 0.2 | 26 | 26 | None | 3.5 | |
| Example 25 | A | 100 | Glass fiber | 50 | PE | $4.0 \times 10^5$ | 0.45 | 7 | 0.5 | 26 | 26 | " | 3.5 | |
| Example 26 | A | 100 | Glass fiber | 50 | PE | $4.0 \times 10^5$ | 0.45 | 7 | 1.0 | 25 | 26 | " | 3.4 | |
| Example 27 | A | 100 | Glass fiber | 50 | PE | $4.0 \times 10^5$ | 0.45 | 7 | 5.0 | 26 | 26 | " | 3.4 | |
| Example 28 | A | 100 | Glass fiber | 50 | PE | $4.0 \times 10^5$ | 0.45 | 5 | 1.0 | 25 | 26 | " | 3.4 | |

*1: PE = polyethylene

As shown above, the shaped articles of liquid crystalline polymer composition according to the present invention are excellent in thermal resistance, mechanical properties, retention rate of a weld strength of 15% to 100% obtained by the following formula (1), based upon flexural strengths determined from a weld shaped article (X) having a weld, which is provided by plural melted resin flows encountering in a mold, at substantially the center portion thereof and a non-weld shaped article (Y) having no weld therein, both obtained by injection molding the composition under the following conditions:

Retention rate of weld strength (%)=(Flexural strength of shaped article (X) having weld/Flexural strength of shaped article (Y) having no weld)×100     (1)

Injection molding condition:

Cylinder temperature: Melting point (°C.) of liquid crystalline polymer +10° C.

Mold temperature: 90° C.

Size of shaped article: 6.0 mm (width)×127 mm (length) ×1 mm (thickness).

2. A shaped article as claimed in claim 1, having the weld portion with a retention rate of a weld strength is 20% to 100%.

3. A shaped article as claimed in claim 1, wherein the liquid crystalline polymer (A) is at least one polymer selected from the group consisting of fully aromatic liquid crystalline polyesters, fully aromatic liquid crystalline polyesteramides, liquid crystalline polyesters having an ethylenedioxy unit, and liquid crystalline polyesteramides having an ethylenedioxy unit.

4. A shaped article as claimed in claim 3, wherein the liquid crystalline polymer (A) is at least one polymer selected from the group consisting of liquid crystalline polyesters having an ethylenedioxy unit and liquid crystalline polyesteramides having an ethylenedioxy unit.

5. A shaped article as claimed in claim 4, wherein the liquid crystalline polyester (A) is at least one liquid crystalline polyesters composed of the following structural units (I), (III) and (IV), liquid crystalline polyesters composed of the following structural units (I), (II) and (IV), and liquid crystalline polyesters having the following structural units (I), (II), (III) and (IV):

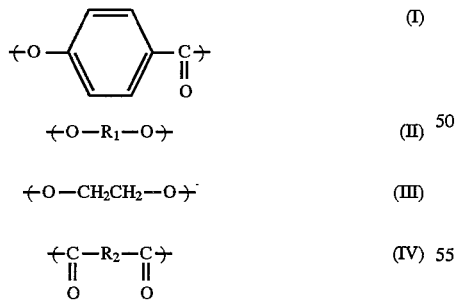

wherein $R_1$ represents at least one group selected from the group consisting of:

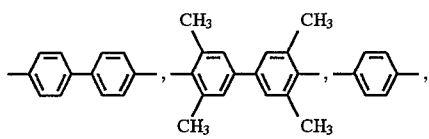

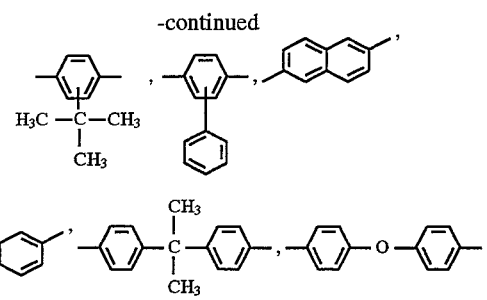

and $R_2$ represents at least one group selected from the group consisting of:

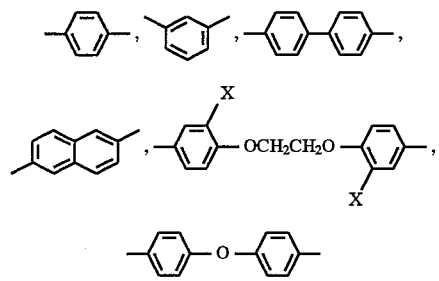

wherein X represents a hydrogen atom or chlorine atom, and the total number of moles of structural unit (II) and structural (III) are substantially equal to the total of the number of moles of structural unit (IV).

6. A shaped article as claimed in claim 1, wherein the composition further contains 400 parts by weight or less of a filler, based upon 100 parts by weight of the liquid crystalline polymer (A).

7. A shaped article as claimed in claim 1, wherein the composition further contains 0.5 to 60 parts by weight of an organic bromine compound based upon 100 parts by weight of the liquid crystalline polymer (A).

8. A shaped article as claimed in claim 7, wherein the organic bromine compound is poly(brominated styrene) having a weight average molecular weight of $1\times10^3$ to $120\times10^4$ and having at least one following structural unit obtained from brominated styrene monomer as the major structural component.

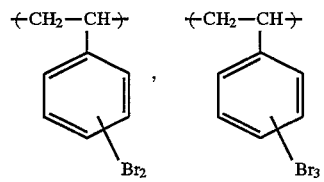

9. A shaped article as claimed in claim 8, wherein the composition further contains 0.01 to 10 parts by weight of carbon black, based upon 100 parts by weight of the liquid crystalline polymer (A).

10. A shaped article as claimed in claim 1 wherein the composition further comprises 400 parts by weight or less of a glass fiber filler, based upon 100 parts by weight of the liquid crystalline polymer (A).

11. A shaped article as claimed in claim 1 wherein the composition further comprises 400 parts by weight or less of a glass fiber and mica filler, based upon 100 parts by weight of the liquid crystalline polymer (A).

12. A shaped article as claimed in claim 1 wherein the composition further comprises 400 parts by weight or less of a glass fiber and talc filler, based upon 100 parts by weight of the liquid crystalline polymer (A).

13. A shaped article as claimed in claim 7 wherein said organic bromine compound is selected from the group consisting of poly(brominated styrene), dibrominated styrene, tribrominated styrene, brominated epoxy polymer and brominated polycarbonate.

14. A shaped article as claimed in claim 1 wherein the weight-average molecular weight of the olefinic polymer is 30,000 to 600,000.

* * * * *